July 21, 1959   R. W. MURDOCK ET AL   2,896,065
WELDING STUD AND FERRULE
Filed Jan. 23, 1957

INVENTOR.
Robert C. Singleton
BY Robert W. Murdock

United States Patent Office 2,896,065
Patented July 21, 1959

2,896,065

WELDING STUD AND FERRULE

Robert W. Murdock, Vermilion, and Robert C. Singleton, Oberlin, Ohio, assignors to Gregory Industries, Inc., Detroit, Mich., a corporation of Michigan Application January 23, 1957, Serial No. 635,819

2 Claims. (Cl. 219—99)

The present invention relates to the welding or brazing of studs and more in particular to the welding of studs wherein the welding end is of smaller size than the remainder of the stud and a special ferrule is needed to assist the welding of that smaller end.

The welding of studs using a ceramic or other type ferrule is well known in the art. In prior devices, the welding end of the stud was as large in cross section or diameter as the remainder of the stud so that the ferrule could be slideably mounted on the stud with the ferrule having an internal cavity therein to provide space for the formation of a fillet around the welding end of the stud. In welding such studs, the ferrule is seated relatively stationarily against the plate or work piece and the stud is movably positioned inside of the ferrule. During the weld cycle the stud is generally withdrawn from the plate a distance called the lift distance, maintained in a lifted position for a definite period of time while a welding arc between the stud and the plate melts the end of the stud, and is then plunged back towards the plate through a plunging distance. Best results have been obtained when the lifting distance is shorter than the plunging distance because a part of the welding end of the stud is completely melted by the arc and many times a part of the plate next adjacent thereto is also melted.

With these prior studs it was necessary that the welding end of the stud, before it was welded, be at least as long as the axial length of the ferrule plus the difference between the lifting and plunging distances. If the stud was provided with a shoulder which would not readily go through the ferrule and that shoulder, or the like, was so positioned that the welding end length was not at least as great as the axial length of the ferrule plus the difference between the lifting and plunging distance, the stud would bump against the ferrule instead of properly seating in the plate during the plunge part of the cycle, thus a good weld would not be obtained since there would not be complete plunge of the stud into the work plate.

In many applications, engineers prefer to have a stud extending from a work plate wherein the fillet diameter or the outside diameter of the fillet which extends around the welding end of the stud and is between the stud shoulder and the plate, is no greater than the diameter of the stud at a very short distance from the plate and the shoulder is at a distance from the plate less than the axial length of the ferrule. Various attempts have been tried in an effort to make ferrules which would permit welding such studs or which also would solve these problems. Attempts have been made to find new welding procedures wherein the well known type of ferrules could be used.

It was found however, that the various welding methods, using the old type ferrule, permitted above mentioned bumping of the stud shoulder on the ferrule, resulting in a poor weld. On the other hand, attempts to eliminate or greatly reduce the axial length of the ferrule, and reduce it to practically a ring having an axial length approximately equal to the height, or axial length of the fillet, was inmpractical. Such ferrules would either break from heat shock or they could not be easily kept in concentric alignment with the stud being welded to the plate. Further problems of holding the ferrules when they were so thin or had an axial length less than the length of the welding end of the stud also resulted.

The present invention is directed to the solving of these and other problems in a manner which is economical, simple, easy to use and does not make any changes in the present basic method of stud welding as is commonly used in commercial practice.

Therefore, one of the objects of the present invention is to provide the combination of a welding stud and a ferrule which is new, novel, practical and which will provide a high quality weld of the stud to work by the stud welding process.

Another object of the present invention is to provide a ferrule for use in welding a stud having a welding end of a diameter smaller than the internal diameter of the ferrule and an axial length less than the axial length of the ferrule.

A further object of the invention is to provide a ferrule for welding a large diameter stud having a reduced diameter welding end of short length wherein the ferrule is maintained in welding position alignment by the large diameter portion of the stud and has a fillet forming radially inwardly extending flange portion of a diameter to form a fillet around the welding end of the stud.

Other objects of the invention will become apparent from a fuller understanding of the invention as hereinafter described and claimed.

Basically the invention consists of a welding stud and a ferrule held in cooperative arrangement for the end arc welding or stud welding or brazing of the welding or brazing end of the stud to a work plate with weld metal or brazing metal. The stud has a body portion of one diameter and a welding end of a second diameter which is smaller than the first diameter. The ferrule has an internal diameter defined by a body portion substantially equal to the diameter of the body portion of the stud and has on one end thereof an internal flange of a diameter larger than the diameter of the welding end of the stud and smaller than the diameter of the body portion of the stud. This flange portion has an axial length less than the axial length of the welding end of the stud while the whole ferrule has an overall axial length greater than the axial length of the welding end of the stud. In actual practice it has been found best to have the ferrule sufficiently long so that its axial length is greater than the axial length of the welding end of the stud plus the difference between the lifting distance and the plunging distance. The axial length of the inwardly extending flange is less than the axial length of the welding end of the stud, minus the plunging distance of the stud.

The stud may be provided on the welding end thereof with brazing material if desired. Also it is understood that even though a stud and ferrule having diameters are described, the studs and ferrules may be of round, square or other cross sections and thus would have cross dimensions instead of diameters when they are other than round.

The stud and a ferrule used in combination therewith for welding the stud in accordance with the present invention may take physical shape in the example illustrated in the drawings for purposes of description and not of limitation and in which.

Figure 1:
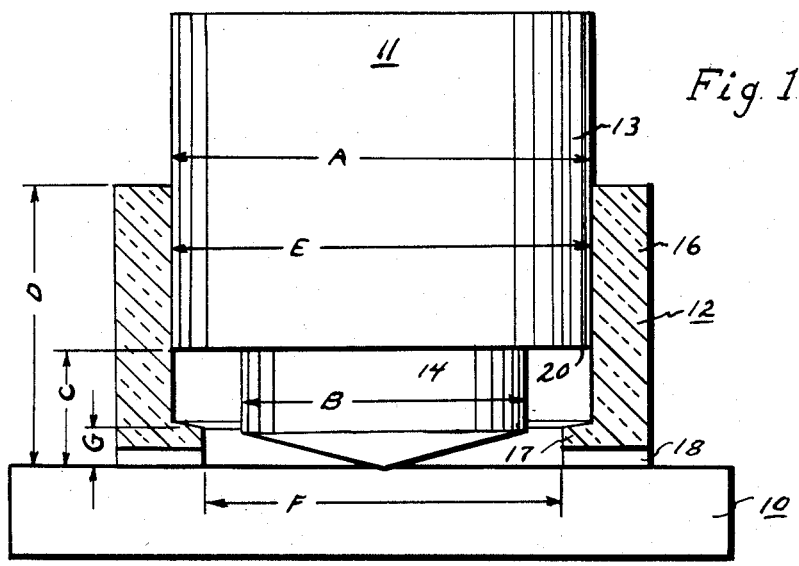
Figure 1 illustrates the stud and the ferrule in position against the work plate just prior to the welding of the stud to the work plate.

Referring to Figure 1, there is illustrated a work plate 10, a stud 11 and a ferrule 12 aligned in welding position and just prior to the welding of the stud to the work plate. The ferrule and the stud may be supported in standard stud welding apparatus commonly used in the industry, such for example, as is illustrated in United States Patent No. 2,413,189 issued Dec. 24, 1946 to T. Nelson.

The stud 11 illustrated has a main body portion 13 of a cross dimension or diameter A, and a welding end portion 14 of a cross dimension or diameter B and an axial length before welding C. The diameter B is less than the diameter A.

The ferrule 12 is constructed of a somewhat sleeve or tubular shaped body 16 having an internal diameter or cross dimension substantially equal to or slightly greater than the diameter or cross dimension A and an axial length D. Extending inwardly from one end of the body 16 and integrally joined therewith is a flange portion 17 having an internal diameter or cross dimension F greater than the diameter B and less than the diameter A. This flange 17 has an axial length G less than the axial length C or less than the axial length of the welding end 14 of the stud. When the stud and the ferrule are aligned ready for welding, as illustrated in Figure 1, the main body 13 extends into the ferrule body 16 and the welding end 14 of the stud extends thru the flange 17 to engage the plate 10. If desired, the flange 17, which seats against the plate 10 may be provided with recesses 18 or vents for venting purposes comomnly known in the welding field.

In welding the stud 11 to the plate 10, the stud 11 is withdrawn from the plate a lift distance and is then plunged back into the plate a plunge distance to complete the weld. In observing Figures 1 and 2 it is apparent that the plunge distance is greater than the lift distance.

The lift distance commonly used in stud welding, or the distance in which the stud is lifted or retracted from the work to strike the arc, is less than the difference between the length D and C so that the main body 13 will not be retracted from the main body 16 of the ferrule during the lift part of the welding operation. In this way the main body of the stud maintains the main body of the ferrule in concentric alignment therewith, thus maintaining the flange 17 of the ferrule in concentric alignment with the welding end 14, and even though no part of the ferrule is in engagement with the welding end 14 or conversely even though all parts of the ferrule are spaced from and separated from the welding end 14 of the stud.

After a welding arc has been maintained for a certain period of time, the stud is plunged for the plunge distance so that molten material from the welding end 14, and in many instances from the work plate, form a fillet such as fillet 19 around the unmolten portion of the welding end 14. Generally when the stud is welded to the plate both the welding end and plate are melted, whereas, if the stud has brazing material on the end, only the brazing material is melted.

Figure 2:
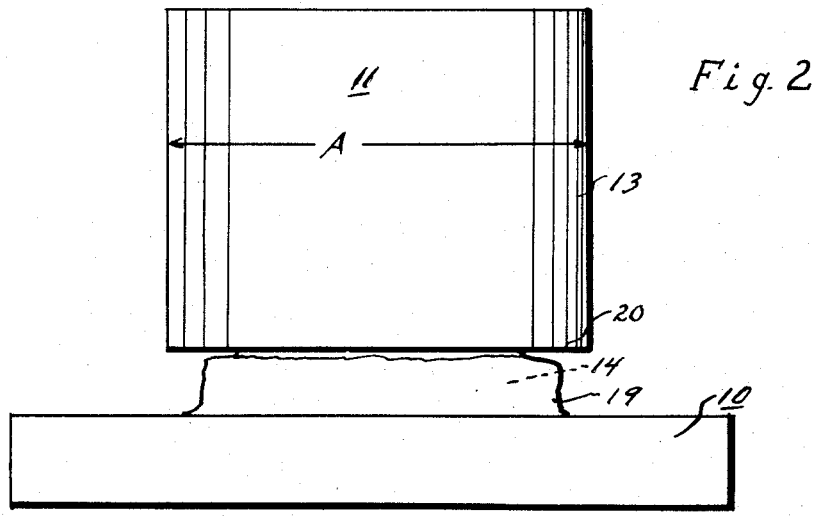
Figure 2 illustrates a completed weld after the ferrule has been removed.

This fillet 19, when it hardens, is substantially within and actually is substantially formed by the flange 17 so that it has a diameter substantially equal to the internal diameter F of the flange 17. Thus the completed fillet 19 has a diameter less than or no greater than the diameter of the main body portion 13 of the stud 11. After the fillet has hardened and the weld or braze is completed, the ferrule may easily be broken away so that a completed weld or braze, and as illustrated in Figure 2, is obtained. In the completed weld of Figure 2, it is noted that the shoulder or end 20 of the main body portion 13 is closer to the plate 10 and is spaced from the plate 10 a distance less than the length of the welding end 14 and less than the length D of the ferrule 12 or the body 16 of the ferrule 12.

It is apparent from the foregoing description of a specific embodiment of the invention that the problems as hereinbefore set forth have been solved and that studs having a welding end of much shorter length than herebefore can be welded or brazed. It is further apparent that studs having a welding end of a small diameter and a short length as compared to the main body portion of the studs may be welded or brazed in such manner that weld or braze metal joins the stud to the plate and a weld or braze fillet is obtained around the welding end of the stud with the fillet having a diameter less than the diameter of the main body portion of the stud.

Although the specific embodiment has been described in connection with a cylindical stud it is readily understood that it may be used in connection with square, rectangular, octangular or other designs of studs, thus the terms diameter and cross-dimension are used herein in a broad sense to include dimensions measured transversely to the axis of the stud or ferrule.

It is also appreciated that various modifications and details in structure of the invention may be had without departing from the spirit and scope of the invention as hereinafter claimed.

What is claimed is:

1. In combination a welding stud and ferrule for end arc welding the stud to a work plate, said stud comprising a main body and a welding end with the welding end having a cross dimension less than the cross dimension of the main body and having a predetermined axial length, said ferrule having a body slideable on said main body and having an axial length greater than the said predetermined length, said ferrule having an inwardly extending flange on one end thereof with an internal cross dimension greater than the said cross dimension of the welding end of the stud and less than the said cross dimension of the main body of the stud, said flange encircling said welding end and having an axial length less than the predetermined axial length of the welding end.

2. A ferrule adapted to be used in combination with a stud for welding the stud to a work plate, said ferrule comprising a tubular shaped body having an internal through bore consisting of a first stud engaging guide portion and a second reduced end portion, said second portion formed by an inwardly extending flange at one end thereof, said tubular shaped body having a first internal cross dimension and said flange having a second internal cross dimension less than said first internal cross dimension.

References Cited in the file of this patent
UNITED STATES PATENTS

| | | |
|---|---|---|
| 2,416,204 | Nelson | Feb. 18, 1947 |
| 2,491,479 | Dash | Dec. 20, 1949 |
| 2,493,283 | Evans | Jan. 3, 1950 |
| 2,829,234 | Van Den Blink | Apr. 1, 1958 |

FOREIGN PATENTS

| | | |
|---|---|---|
| 649,177 | Great Britain | Jan. 17, 1951 |